United States Patent
Small et al.

(10) Patent No.: US 6,251,150 B1
(45) Date of Patent: Jun. 26, 2001

(54) SLURRY COMPOSITION AND METHOD OF CHEMICAL MECHANICAL POLISHING USING SAME

(75) Inventors: Robert James Small, Dublin; Maria Louise Peterson, Menlo Park; Tuan Troung, San Jose, all of CA (US); Lionel Bonneau, Cran Gevrier; Jean Claude Drouget, Annecy le Vieux, both of (FR)

(73) Assignees: EKC Technology, Inc., Hayward, CA (US); Baikowski Chimie, Annecy (FR)

( * ) Notice: Subject to any disclaimer, the term of this patent is extended or adjusted under 35 U.S.C. 154(b) by 0 days.

(21) Appl. No.: 09/321,036

(22) Filed: May 27, 1999

(51) Int. Cl.$^7$ ................................ C09K 3/14; C09G 1/02
(52) U.S. Cl. .................... 51/307; 51/309; 106/3; 438/692; 438/693; 510/397; 423/593; 423/595; 423/594; 423/598; 423/599; 423/600
(58) Field of Search ................ 51/307, 308, 309, 51/293; 106/3, 401, 426, 461; 438/692, 693; 510/397, 163, 165, 167, 175, 180, 181; 423/593, 594, 595, 598, 599, 600

(56) References Cited

U.S. PATENT DOCUMENTS

| | | |
|---|---|---|
| 3,662,501 | 5/1972 | Mendel . |
| 4,075,029 * | 2/1978 | Nuss ..................... 106/401 |
| 4,314,827 | 2/1982 | Leitheiser et al. . |
| 4,532,121 | 7/1985 | Bachelard et al. . |
| 4,685,937 * | 8/1987 | Hori et al. ............... 51/309 |
| 4,751,016 * | 6/1988 | Tse et al. ................ 51/309 |
| 4,808,327 | 2/1989 | Rousset et al. . |
| 4,959,113 | 9/1990 | Roberts . |
| 5,080,718 * | 1/1992 | Sullivan et al. ............ 106/401 |
| 5,139,570 * | 8/1992 | Castrogiovanni et al. .......... 106/3 |
| 5,282,898 * | 2/1994 | Wu ........................ 106/447 |
| 5,322,563 * | 6/1994 | Von Bonn et al. ............ 106/712 |
| 5,383,945 | 1/1995 | Cottinger et al. . |
| 5,387,268 | 2/1995 | Hiraiwa et al. . |
| 5,527,423 | 6/1996 | Neville et al. . |
| 5,735,729 * | 4/1998 | Kobayashi et al. ............ 51/308 |
| 5,735,963 | 4/1998 | Obeng . |
| 5,759,917 * | 6/1998 | Grover et al. ............... 51/309 |
| 5,776,214 * | 7/1998 | Wood ..................... 51/309 |
| 5,993,686 * | 11/1999 | Streinz et al. .............. 51/309 |

FOREIGN PATENT DOCUMENTS

| | | |
|---|---|---|
| 0 826 756 | 3/1998 | (EP) . |
| WO 98/04646 | 5/1998 | (WO) . |

OTHER PUBLICATIONS

International Search Report for International Application No. PCT/US 00/11675 dated Sep. 5, 2000.

* cited by examiner

Primary Examiner—Michael Marcheschi
(74) Attorney, Agent, or Firm—Alston & Bird LLP (57) ABSTRACT

The present invention provides a slurry composition for chemical mechanical polishing comprising spinel particles having the formula $AO \cdot xZ_2O_3$ wherein A is at least one divalent cation, Z is at least one trivalent cation, and $0.01 \leq x \leq 100$. The present invention also includes a method of chemical mechanical polishing the surface of a substrate using slurry compositions that include these spinel particles. The slurry compositions of the present invention provide the desired level of planarization and selectivity for both metal and oxide surfaces. In addition, the slurry compositions of the invention can be prepared such that they are substantially free of alpha phase alumina particles and other high hardness particles to produce a scratch-free polished surface.

43 Claims, 1 Drawing Sheet

FIG. 1.

SLURRY COMPOSITION AND METHOD OF CHEMICAL MECHANICAL POLISHING USING SAME

FIELD OF THE INVENTION

The present invention relates to slurry compositions for polishing substrates and more particularly to slurry compositions that include spinel particles for the chemical mechanical polishing of substrates.

BACKGROUND OF THE INVENTION

Chemical mechanical polishing or planarization (CMP) is a rapidly growing segment of the semiconductor industry. CMP provides global planarization of the wafer surface thus improving the coverage of the wafer with dielectric (insulators) and metal substrates. This planarity also increases lithography, etching and deposition process latitudes.

CMP has been evolving for the last fifteen years and has been adapted for the planarization of inter-layer dielectrics (ILD) for multi-layered metal (MLM) structures. In particular, CMP has been successfully applied to the planarization of interdielectric levels of silicon oxides, BPSG, silicon nitride and also metal films. Some of the surfaces of current interest include tungsten (W), aluminum (Al), copper (Cu), titanium (Ti), titanium nitride (TiN), tantalum (Ta), silicon nitride (SiN), low-K and high K dielectric, silicon, polysilicon, tetraethoxysilane (TEOS), tantalum nitride (Tan) and boron phosphorous silicate glass (BPSG) surfaces.

In the semiconductor industry, the role of CMP is becoming increasingly important as computer chips are being modified for increased performance. In particular, feature sizes of computer chips continue to be reduced, the number of metal layers or "wires" and the length of "wires" per chip continue to be increased, and the operating frequency of chips also continue to be increased. It is expected that in 2001, DRAM chips will have a memory of 1 gigabit and a typical CPU will have 13 million transistors/cm². These performance improvements in computer chips increase the need for a three dimensional construction on the wafer chip to reduce delays of the electrical signals and for methods to produce these constructions. Therefore, as these changes become implemented, and especially as features sizes become smaller, the planarity requirements for better lithography will become critical.

To meet these new demands, certain aspects of conventional CMP methods must also be improved. For example, there is an increased emphasis on reducing CMP defects in metal and insulator layers, producing better planarity within the wafer and between wafers, avoiding pre-mixed concentrates that require point-of-use mixing, providing a high polishing selectivity, improving post-CMP cleaning methods, and providing better end-point detection (EPD). There are also environmental, health and safety issues associated with CMP and post-CMP cleaning such as reducing the requirement for vapor handling, providing slurry recycling or more environmentally friendly slurry residues, and producing more stable chemistries for use with abrasives.

The conventional CMP process used for polishing wafers typically consists of the rotation of a wafer on a rotary platen in the presence of a polishing medium and a polishing pad that grinds away the surface material. The CMP process is actually considered to be a two-part mechanism: the chemical modification of the surface of the material and the mechanical removal of the modified material by mechanical grinding. The challenge of the process is to control the chemical action on the substrate and the rate of the grinding while maintaining a high selectivity or preference for removing the offending wafer features without significant damage to the desired features.

An additional concern is that CMP processes are very sensitive to structural pattern density. In particular, large area features are planarized slower than small area features. As a result, polishing wafers having features with varying areas can result in metal structure "dishing" wherein metal plug connectors are recessed below the planarized surface. Furthermore, oxide erosion can also occur, which results in removal of desired oxide features. Both "dishing" and oxide erosion negatively affect the operation of the wafer.

Furthermore, there are different issues associated with polishing different types of surfaces. For example, CMP slurries for metal polishing must have a high metal removal rate (1000's Å/min) and must also have high selectivity so that they remove metal and not the dielectric features on the wafers. This type of polishing relies on the oxidation of the metal surface and the subsequent abrasion of the oxide surface with the CMP slurry composition. The general oxidation reactions are as follows (M=metal atom):

Under ideal conditions, the rate of metal oxide ($MO_x$) formation $V_F$ will equal the rate of metal oxide polishing $V_p$, that is $V_F = V_p$. The removal rate for the metal surface is typically between 1700 and 7000 Å/min. In addition, the polishing selectivity of metal to dielectric generally ranges from 20:1 to 100:1, depending on the metal type, and can be even as low as 1:1.

The pH of slurry used for polishing can greatly affect the polishing process. If the pH is too low then the chemical agents in the slurry can rapidly penetrate the metal oxide and attack the metal, such that $V_F < V_p$, thus exposing the metal without any further oxide formation. When this occurs, the metal surfaces, both at high points and in valleys, are removed at the same rate. Thus, planarization of the surface is not achieved. In addition, this situation can cause "dishing" as described above, which eventually leads to poor step coverage and possibly poor contact resistance. Alternatively, if the pH is too high, the oxide layer formed on the surface of the metal can become essentially impenetrable to the chemical agents in the slurry. In this case, the metal becomes passive, such that $V_F > V_p$ and the metal polishing rate becomes slow.

One particular problem with some metal slurries is that the low pH and highly corrosive oxidants being used with in the metal CMP process can corrode polishing equipment. For example, slurries that include ferric nitrate oxidizing agents require a low pH and these slurries are known to stain and corrode polishing equipment.

In addition, because of chemical stability problems, many slurries must be prepared at the point of use because they have little or no pot life. For example, slurries that include hydrogen peroxide oxidizing agents are generally not stable when premixed with the other slurry components and therefore have to be delivered to the polishing equipment with separate pumping systems and mixed at the point of use. Moreover, other slurries, such as those that use potassium iodate system require special handling. Metal polishing slurries can also contribute to mobile ion contamination, can affect the slurry particle distribution and compositions, and can be toxic to the environment.

There are similar problems and concerns associated with the polishing of ILD (oxide) surfaces. One particular concern with ILD polishing is surface damage such as scratching. Other important concerns in ILD polishing include polishing rate, planarity, and wafer polishing uniformity both within the wafer and from wafer to wafer.

The CMP mechanisms of ILD polishing are still being developed, but the polishing process appears to involve two concurrent processes: a mechanical process involving plastic deformation of the surface; and chemical attack by hydroxide ($^-OH$) to form silanol bonds. The chemical reactions are believed to occur as follows:

As with metal polishing slurries, the pH for ILD polishing slurries is important. Specifically, for silicon oxide, the pH should to be between 10 and 11.5. If the pH is too high, the polynuclear species may start to precipitate in an unpredictable manner. This precipitation can lead to gelling, which can lead to microscratches. There is also the possibility that the oxidation process will form Si—O—Si bonds as shown in equation (4) above. The formation of Si—O—Si bonds basically occurs uncontrollably thus reversing the polishing process and resulting in poor planarization. If the pH is too low, the removal rates are too slow.

As mentioned above the typical silicon surface has terminal —OH groups under neutral or basic conditions. As a result, the silicon surface is hydrophilic so the surface is wettable. The —OH groups activate the surface to a number of possible chemical or absorption phenomena. For example, these groups can impart a weak acid effect that allows for the formation of salts. In addition, the Si—OH groups can exchange the proton ($H^+$) for various metals. These Si—$O^{31}$ and Si—OH groups can also act as ligands for complexing cations including Al, Fe, Cu, Sn and Ca. Moreover, the ILD surface is very dipolar and electrostatic charges can accumulate or be dissipated depending on the bulk solution's pH, ion concentration and charge, as measured by Zeta potential. Each of these phenomena can influence the removal rates, final surface conditions, residual metal contamination, and frequency of scratching on the ILD surface.

Another concern with silica ($SiO_2$) surfaces is that metals can plate on the silica surface. In particular, silica has a modest redox potential and if layers underneath the silica layer are exposed due to an overaggressive polishing process, the result can be that metals such as Cu, Au, Pt, Pb, Hg and Ag plate on the silica surface. Exposure to light can also affect the redox reaction for Cu by generating electrons in the semiconductor Si material thereby reducing the copper ions to $Cu°$.

Both metal and ILD polishing processes must eventually pass through a final cleaning step to remove traces of particles and liquids. Preferably, the CMP methods for both metal and ILD surfaces do not require extensive post-CMP cleaning processes. To this end, it is important that the wafers are relatively clean and include minimal defects such as metal contamination and deposited slurry and pad particles. This limits the need for extensive post-cleaning processes. In particular, post-cleaning residual particle levels should be less than 0.05 particles/$cm^2$ with 90% of the particles being less than 0.2 microns in size. As line widths continue to decrease as improvements are made in chips, the residual particle levels should be less than 0.035 particles/$cm^2$. Incomplete removal of residual particles decreases wafer yield.

For all of the above reasons, the selection of the polishing slurry composition for polishing wafers is a critical part of the CMP process. The current polishing slurries consist of an abrasive suspension (e.g. silica, alumina, ceria or zirconia) usually in an aqueous solution. The type and size of the abrasive, the solution pH, and the presence or lack of oxidizing agents are very important to the success of the CMP process.

In selecting abrasive particles for particular CMP slurries, the particle size, distribution of particle size, crystalline phase, and uniformity of crystalline phase are all properties that affect the chemical mechanical polishing process. For example, alumina abrasives can exist in various crystalline phases including alpha and gamma phases. Because the alpha phase alumina particles generally have large crystallite sizes and have a greater hardness than gamma phase alumina particles, slurries that include alpha phase alumina particles can cause scratching of the surface, especially if used in the final polishing steps. This problem is further complicated by the fact that transition gamma phase alumina particles readily convert to not only the more desirable gamma phase alumina particles but also alpha phase alumina particles at elevated temperatures.

The physical properties of the abrasive particles and particularly the crystalline form will also affect the surface charge or Zeta potential of the polished surface. The Zeta potential can have a great effect in the polishing performance of the slurry. In addition, an undesirable Zeta potential can affect the residual particle surface charge of the polished surface prior to post-CMP cleaning.

For the above reasons, there is a need in the art to provide a chemical mechanical polishing slurry for polishing wafers that has the desired rate of planarization and the desired selectivity. There is also a need in the art to produce a chemical mechanical polishing composition that does not scratch the polished surface or corrode equipment. In addition, there is a need in the art to produce a chemical mechanical polishing slurry for wafers that is stable and that does not require additional handling procedures or post-CMP cleaning steps. There is also a need in the art to improve CMP slurries used to polish other substrates including hard disk surfaces, magnetic rewrite disk heads and ceramic parts.

SUMMARY OF THE INVENTION

The slurry compositions of the present invention provide the desired level of planarization and selectivity for both metal and oxide surfaces without causing undesirable scratching of the surface. In addition, the slurry compositions of the invention do not produce undesirable equipment staining and corrosion. The chemical mechanical polishing compositions of the invention do not require additional handling procedures or post-CMP cleaning steps and can be used with various types of substrates.

The present invention provides a slurry composition for chemical mechanical polishing comprising spinel particles having the formula AO•x$Z_2O_3$, wherein A is at least one divalent cation, Z is at least one trivalent cation, and $0.01 \leq x \leq 100$. The slurry composition of the present invention is preferably substantially free of particles having a Mohs hardness of greater than 8.5, e.g., alpha phase alumina particles, when used in the final chemical mechanical polishing steps and thus provides a scratch-free surface. Furthermore, the spinel particles in the slurry composition of the invention are stable and have good pot and shelf lives.

The spinel particles used in the slurry compositions of the invention preferably have a specific area of between about 5 $m^2/g$ and about 200 $m^2/g$, a mean crystallite diameter of between about 5 and about 500 nm, and a mean aggregate particle diameter of between about 10 and about 5000 nm. In the spinel particles, it is also preferred that $1 \leq x \leq 100$ and more preferred that $1 \leq x \leq 12.5$. Preferably, the A cations in the slurry compositions of the invention are selected from the group consisting of Mg, $Fe^{2+}$, Zn, Mn, Ni, Ca and combinations thereof. The Z cations are preferably selected from the group consisting of Al, $Fe^{3+}$, Cr, Ti, and mixtures thereof. The spinel particles can also include a small amount of at least one cation selected from the group consisting of Zr, Si, Ga, Cu, Co, V, B, Li, rare earth cations, and mixtures thereof.

In a preferred embodiment of the invention, A is Mg, Z is Al, and the formula of the spinel particles is MgO•x$Al_2O_3$. Preferably, the slurry composition is substantially free of alpha alumina particles, especially when it is used in the final chemical mechanical polishing steps. Preferably, the magnesium-aluminum spinel particles are prepared by thermal decomposition of magnesium and aluminum source compounds at elevated temperatures. In this preferred embodiment, the specific area is between about 5 $m^2/g$ and about 200 $m^2/g$, the mean crystallite diameter is between about 5 and about 500 nm, the mean aggregate particle diameter is between about 10 and about 5000 nm, and $1 \leq x \leq 12.5$. The magnesium-aluminum spinel particles can also have certain specific areas and x values that provide increased stability and limited conversion of transition phase gamma alumina particles to alpha phase alumina particles.

In another preferred embodiment of the invention, A is Zn and Z is Al such that the formula of the spinel particles is ZnO•x$Al_2O_3$. In this embodiment, the slurry composition is preferably substantially free of alpha alumina particles, especially when used in the final polishing steps. The zinc-aluminum spinel particles are preferably prepared by the thermal decomposition of zinc and aluminum source compounds at elevated temperatures. The physical properties and preferred values for x for this embodiment are generally similar to those described for the magnesium-aluminum spinels above.

The slurry compositions of the invention are preferably aqueous compositions and typically include spinel particles and at least one liquid component (other than water) in the aqueous medium. Preferably, the liquid component is an oxidizing agent such as ferric nitrate, periodic acid, hydrogen peroxide, hydroxylamine or a hydroxylamine salt solution. In the slurry compositions, the spinel particles are preferably present in an amount between about 0.1 and about 10 percent by weight. The slurry compositions can also include between 0.1 and 10 percent by weight of other abrasive particles.

The present invention also provides a method of chemical mechanical polishing a substrate comprising the steps of applying a slurry composition in accordance with the invention to a surface of a substrate and polishing the surface of the substrate. The CMP method according to the invention can be used on various types of surfaces such as metal and metal oxide surfaces and can be used on various substrates including semiconductors, metals, ceramics, hard disk surfaces, magnetic rewrite disk heads, and the like.

These and other features and advantages of the present invention will become more readily apparent to those skilled in the art upon consideration of the following detailed description and accompanying drawing, which describe both the preferred and alternative embodiments of the present invention.

DETAILED DESCRIPTION OF THE PREFERRED EMBODIMENTS

In the drawings and the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawing.

The present invention provides a chemical mechanical polishing composition that includes spinel particles in an aqueous medium. The spinel particles have the formula AO•x$Z_2O_3$ or [AO]$_{1/x}$•$Z_{23}$ wherein A is at least one divalent cation, Z is at least one trivalent cation, and $0.01 \leq x \leq 100$. Preferably, $1 \leq x \leq 100$ and more preferably $1 \leq x \leq 12.5$. If x is less than 0.01 or greater than 100, the spinel properties are essentially the same as the phase of the AO form or the $Z_2O_3$ form, respectively. Although the spinel particles of the invention are characterized by the formula $AO \cdot xZ_2O_3$, these particles are not mixtures of AO and $Z_2O_3$ but are particles wherein A and Z together form crystallite structures.

In the spinel particles of the invention, A is at least one divalent cation having generally a +2 oxidation state and Z is at least one trivalent cation having generally a +3 oxidation state. Preferably, A is selected from the group consisting of Mg, $Fe^{2+}$, Zn, Mn, Ni, Ca and mixtures thereof and Z is selected from the group consisting of Al, $Fe^{3+}$, Cr, Ti, and mixtures thereof. These spinel particles include those having essentially a maghemite (gamma-$Fe_2O_3$) or chromite structure. In a preferred embodiment of the invention, A is Mg, Z is Al and $1 \leq x \leq 12.5$. In yet another preferred embodiment of the invention. A is Zn, Z is Al and $1 \leq x \leq 12.5$.

One benefit of the spinel particles used in the slurry compositions of the invention is that these particles can be manufactured having desirable crystallite sizes, aggregate sizes, aggregate size distributions, and crystal phase distributions for use in chemical mechanical polishing. The spinel particles and the properties of these particles can be modified by varying x, by using more than one divalent cation as A, and by using more than one trivalent cation as Z. In addition, small amounts of other cations (e.g. up to about 1% of each cation per molar amount of total cations) can also be included in the spinel structure such as Zr, Si, Ga, Cu, Co, V, B, Li and rare earth cations, and mixtures thereof. Exemplary rare earth cations include neodymium, praseodymium, samarium, europium, gadolinium, terbium, dysprosium, holmium, erbium, ytterbium, lutetium, cerium, thulium, and the like. These additional cations can further increase the thermal stability of the spinel structure and allow control of the aggregation of elementary spinel crystallites. These additional cations can also modify the surface activity of each elementary crystallite.

In accordance with the invention, the spinel particles of the invention are prepared to have certain desirable properties. In particular, the mean crystallite diameter of the spinel particles is preferably between 5 and 500 nm, more preferably between 5 and 100 nm. The mean crystallite diameter can be measured, e.g., using x-ray diffraction. The spinel particles preferably have a specific surface area of between 5 $m^2/g$ and 200 $m^2/g$, more preferably between 50 $m^2/g$ and 150 $m^2/g$. The aggregates of the spinel particles used in the invention preferably have a mean aggregate particle diameter of between 10 and 5000 nm, more preferably between 100 and 3000 nm, and further agglomerate into final particles having various particles diameters depending on the final step of the synthesis process (e.g. grinding, selection, atomizing, etc.). The specific surface area and mean aggregate particle size can be measured using a particle size analyzer such as those described below. The spinel particles of the invention also have a crystallite phase distribution including greater than about 95%, preferably greater than about 98% and more preferably greater than about 99% gamma-like spinel phase as measured using x-ray diffraction. This gamma-like phase has a spinel structure with a high level of cationic vacancies.

It has been discovered that this gamma-like phase is particularly useful at polishing surfaces without scratching.

In addition, the slurry composition is also substantially free of particles that have a high Mohs hardness of greater than 8.5, e.g., $\alpha$-$Al_2O_3$ particles, that can scratch the polished surface, particularly when used as the last polishing slurry to polish the substrate. In particular, the abrasive particles in the slurry composition include a total of less than about 5% of $\alpha$-$Al_2O_3$ and other high Mohs hardness particles, preferably less than about 2% and more preferably less than about 1%.

In the spinel particles of the invention, it has been discovered that the presence of A cations not only gives the resulting spinels certain structural characteristics but also stabilizes the transition gamma phase particles in primarily the gamma spinel phase. In addition, the A cations can be used to control the particle size and aggregate formation of the gamma spinel crystallites. Typically, the stabilization of the gamma phase and the control of particle size and aggregate formation increases as the A content increases. These features of the invention are important because the polishing efficiency of the slurry composition is believed to occur essentially by aggregates of elementary gamma phase crystallites. Furthermore, gamma alumina is sensitive to heat treatment during its formation and the formation of alpha phase particles from the transition gamma phase particles generally cannot be avoided. For example, transition gamma alumina can convert to gamma or alpha alumina particles with conversion to the alpha alumina phase producing crystallites with drastically higher diameters than the gamma phase precursor. As mentioned above, the presence of alpha phase alumina and other high hardness particles in the slurry composition, even in small amounts, generates scratches on the surface of polished substrates when used in the final polishing steps and is therefore undesirable.

Figure 1:
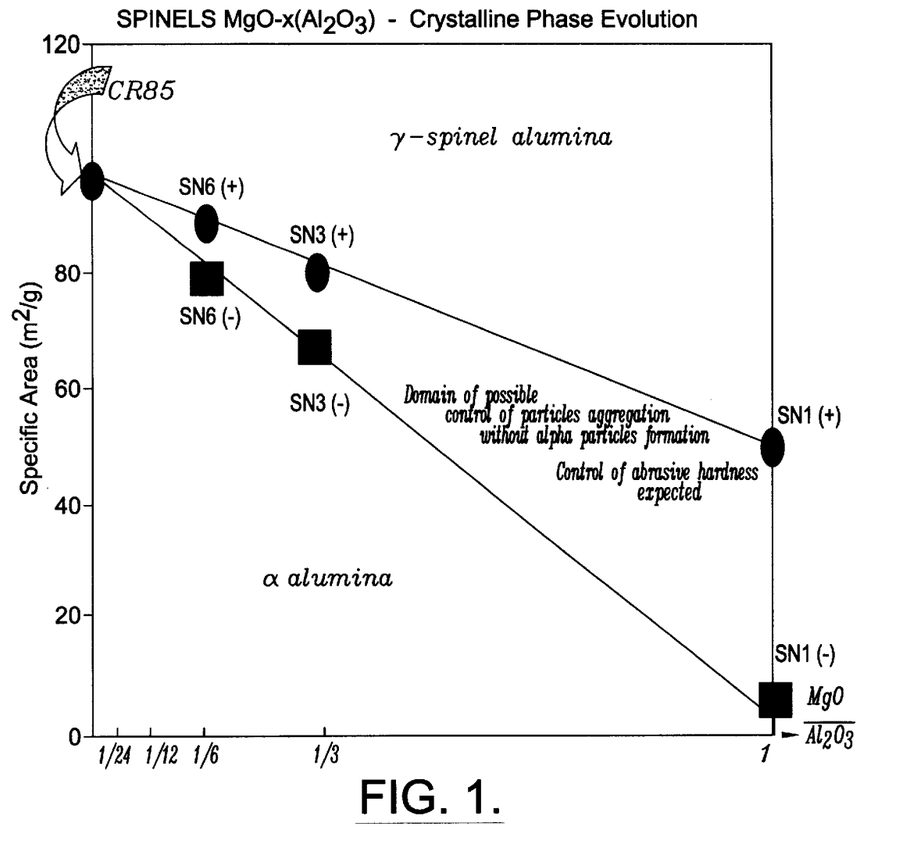
FIG. 1 is a crystalline phase diagram of 1/x (MgO/$Al_2O_3$) versus specific area for MgO•x$Al_2O_3$ particles prepared according to one embodiment of the invention.

As illustrated in FIG. 1, for a preferred embodiment of the invention wherein A is Mg and Z is Al, at certain specific areas and for specific values of 1/x (i.e. $MgO \cdot Al_2O_3$), there is a range of values wherein particle aggregation can occur without the formation of alpha particles. In this range, the hardness of the spinel particles can be controlled to produce desirable spinel particles for CMP. In particular, any values above the line formed by SN6 (–), SN3 (–) and SN1 (–) produce desirable spinel compounds for use in the invention, wherein SN6, SN3 and SN1 correspond to $MgO \cdot 6Al_2O_3$, $MgO \cdot 3Al_2O_3$, and $MgO \cdot Al_2O3$, respectively. It is noted that although FIG. 1 is illustrative of the spinel particles of the invention, it would be understood in the art that other combinations of A and Z would produce different crystalline phase diagrams. In addition, it will be understood that other combinations of A and Z will also produce different crystalline forms, surface potentials, and other characteristics.

The spinel particles of the invention can be prepared by various methods and are preferably prepared using thermal decomposition. In particular, the spinel particles are preferably prepared by the decomposition of one or more source compounds comprising A cations and one or more source compounds comprising Z cations. Preferably, the source compounds are inorganic salts. The ratio of the A cation source compounds and Z cation source compounds are predetermined based on the desired stoichiometry in the spinel particles. The mean particle size of the starting materials is typically lower than 3 mm and preferably around 100 microns or less, although larger particles that will at least partially dissolve can also be used. This allows sufficient mixing and/or dissolving of the source compounds. Preferably, the source compounds are completely dissolved in water but suspension of insoluble source compounds in water is acceptable. The solution or suspension can also include certain additives such as carbohydrates and urea as described in U.S. Pat. No. 4,532,121.

In accordance with specific embodiments of the invention, an ammonium alum (e.g. ammonium aluminum sulfate powder) is preferably used as the source of aluminum cations but aluminum oxides (e.g. $\gamma$-$Al_2O_3$) can also be used. Where A is Mg, the source of magnesium compounds can include magnesium sulfate and/or ammonium magnesium sulfate powder. Where A is Zn, a zinc salt (e.g. zinc sulfate) can be used as the source of zinc cations.

The mixed source compounds are fed to a furnace or another heat source that permits close temperature control to achieve thermal decomposition. Typically, the mixed source compounds are heated at a temperature from about 900° C. to about 1600° C., preferably about 1000° C. to about 1350° C. The decomposition temperature depends on the specific cation source compounds used to form the spinel particles. The rate of temperature increase to heat the material is not critical and rates between about 10 and about 100° C./min can be used. The materials are typically held at the desired temperature for about 30 to about 180 minutes to form the spinel particles. The rate of temperature decrease or cooling is also not critical and rates of about 20 to about 100° C./min can be used.

Once the spinel particles have been cooled, the spinel particles can be subjected to additional processing steps including grinding, milling, selection, atomizing, or other techniques known in the art. Suitable grinding or milling equipment can be horizontal or vertical, wet or dry, and is available from Netzsch, CB Mills, Glen Mills, Eiger, Chicago Boiler, Morehouse, Sweco and Jet Pulverizer. Suitable equipment for determining particle size is available from Coulter, Horiba, Matec, Cilas, Malvern, and Particle Sizing Systems. One preferred process mills the particles in a jet mill to a mean particle size of between about 10 nm and about 2 microns for use in the polishing slurry.

As mentioned above, the slurry compositions of the invention include the spinel particles in an aqueous medium. Preferably, the amount of spinel particles in the aqueous medium is between 0.1% and 10% by weight. Other abrasive particles can be used with the spinel particles such as alumina (e.g. gamma alumina), silica, ceria, germania, zirconia, tin oxide, silicon carbide, titanium dioxide, titanium carbide, and the like. These additional particles are present in an amount between 0.1% and 10% by weight. For example, the slurry composition can include 1% by weight of spinel particles and 0.5% by weight of silica particles. The slurry composition can also be concentrated for transport or storage.

In addition to water, the slurry composition typically includes other liquid components and the selection of these liquid components can also be important to the CMP process. Exemplary liquid components include oxidizing and reducing agents such as hydroxylamine compounds including hydroxylamine and its derivatives (chloride, sulfate, nitrate and other salts). These hydroxylamine compounds are disclosed in application PCT/US97/12220 (publication number WO 98/04646), which is incorporated by reference herein in its entirety. The hydroxylamine or hydroxylamine salts can react with terminal groups on the particle surface through either a redox reaction or a normal chemical reaction. Since the hydroxylamine chemistries can be chemically "tuned" by adjusting the pH and still be active for metal CMP at less corrosive pH's. These compounds provide a wider process window for adjusting the Zeta potential of the slurry. The ability to similarly "tune" the particles' Zeta potential is of enormous benefit in designing slurries that effectively polish the surface and that can be removed from the surface after polishing. The particles of the invention can be "tuned" so that they can generally be used with any liquid composition known to be useful for polishing applications.

Other oxidizing or reducing agents can also be used in the invention including ammonium persulfate; hydrogen peroxide; peracetic acid; periodic acid; ferric nitrate; ammonium peroxy compounds; ammonium bifluoride; polyelectrolytes; organic acids (e.g. malonic acid, succinic acid, tartaric acid, citric acid, and oxalic acid); peroxymonosulfuric acid; potassium peroxymonosulfate or malonamide; lithium periodate; potassium iodate; potassium periodate; perborates; peroxyhydrates; urea hydrogen peroxide complexes; inorganic halides particularly fluorides; nitrates; hypohalites (e.g. hypochlorites); cyanides; permanganates; and the like. Chelating agents can also be used such as alkyl beta-diketone, alkylene tetraacetic acids, aromatic phenolic aldehydes, bis(hydroxypropyl) hydroxylamine, anisaldehyde, alpha hydroxy isobutyric acid, aromatic dioxygenated compounds, catechol compounds and gallic acid compounds. Other additives can also be used such as surfactants, stabilizers, suspension agents, buffers, lubricants and the like.

The slurries of the invention as used for chemical mechanical polishing typically include by weight 1–10% abrasive particles, 1–15% oxidizing agents, and the balance water. Preferably, the chemical mechanical polishing slurries include 2–5% abrasive particles, 5–10% oxidizing agents, and the balance water. The chemical mechanical polishing slurry can also include up to about 1% of the chelating agent or of any of the other additives described above. The pH of the slurry depends on the surface being polished; however, the spinel particles of the invention have been found to be stable regardless of the pH used.

There are certain characteristics that can be used to determine the desirability of the slurry compositions used in accordance with the invention. In particular, as mentioned above, the crystallite sizes, aggregate sizes, aggregate size distributions, and crystal phase distributions can be important properties of the spinel particles in determining their desirability for use in the invention.

The Zeta potential can also be used to determine the desirability of particular slurry compositions. The Zeta potential is an electrostatic potential measurement of the interaction of the electrostatic double layer ions (anions and cations) that exist around each particle in a solution. The Zeta potential can be positive, zero or negative and for the slurries of the invention is preferably greater than or equal to +10 mV or less than or equal to –10 mV. The types of particles in the slurry composition and the solution pH can both affect the Zeta potential value. In particular, one component of the Zeta potential is the isoelectric point (IEP) for a particle. The IEP is the pH at which the Zeta potential value is zero and is effected by the chemical composition. The IEP of aluminum oxide particles can vary between about 3.8 to 9.4, while silicon oxide has a range of about 1.5 to 3.7. Other IEP values are about 9.5 for $TiO_2$ while tungsten is about 1. Such wide ranges of values pose a major challenge to developing chemistries to control the Zeta potential of the spinel particles or metallic contaminates so they do not adhere to the wafer surface. Another concern is that the Zeta potential between the slurry and metal particles and the wafer will be such that the particles will be attracted and adhere to the wafer surface thereby possibly requiring additional post-CMP cleaning steps to be performed to remove the adhering particles. If the Zeta potential of the slurry composition does not have a desired value, the slurry composition can be susceptible to settling of the slurry particles, which can be detrimental to the performance of the slurry during the CMP polishing process.

The spinel particles of the invention typically have desirable Zeta potentials thus limiting the chance that the slurry particles will settle out of the slurry or that the slurry particles or metal ions will adhere to the wafer surface. In particular, with respect to the preferred embodiment of the invention, water adsorbed on alumina surfaces (hydrated alumina) will disassociate to form protonated sites and hydroxyl sites. By combining MgO and $Al_2O_3$ to form spinels, the surface chemistries and properties can be altered to produce desirable Zeta potentials and electrochemical potentials. In addition, surfactants can be added to reduce the surface charge of the water.

The present invention also includes a method of chemical mechanical polishing a substrate using the slurry compositions described above. The slurry composition is applied to a surface of a substrate and the surface of the substrate is polished using the slurry to a desired end-point or planarization to provide the desired surface. Various types of metal and non-metal surfaces can be polished, including tungsten (W), aluminum (Al), copper (Cu), titanium (Ti), titanium nitride (TiN), tantalum (Ta), silicon nitride (SiN), low-K and high K dielectric, silicon, polysilicon, tetraethoxysilane (TEOS), tantalum nitride (TaN) and boron phosphorous silicate glass (BPSG) surfaces. Exemplary substrates include semiconductor wafers (including devices), metals, ceramics, hard disk surfaces, magnetic rewrite disk heads, and the like. It is noted that the slurry compositions are particularly useful as the last slurry used to polish the surface because they do not scratch the surface. To this end, other slurries, even those containing alpha phase particles, can be used to polish the surface prior to using the slurries of the present invention.

In the case of semiconductor wafers, the chemical mechanical polishing method consists of rotating a wafer on a rotary platen. The slurry composition is applied to the surface of the wafer to be polished and a polishing pad contacts the surface to polish away the surface material. Alternatively, the wafer can be held in place and the pad rotated or both the wafer and the pad can be rotated in the same or opposite directions to produce a similar effect.

Once the chemical mechanical polishing is completed, the wafers are typically subjected to post-CMP cleaning steps to remove metal contamination or residual particles from the pad or slurry. Suitable methods for removing impurities such as particles or ions from the wafer surface include physical desorption using solvents, changing the surface charge using either acids or bases, ion competition, oxidizing or decomposing impurities, and etching the surface. For example, the post-CMP cleaning processes can include compositions that combine DI water and either ammonium hydroxide or HF, or standard RCA SC-1 ($NH_4OH:H_2O_2:H_2O$) and SC-2 ($HCl:H_2O_2:H_2O$) cleaning steps. Other suitable post-CMP cleaning processes are described in application PCT/US97/12220.

The present invention will now be further described by the following non-limiting examples.

EXAMPLE 1

Spinels of the formula $MgO \cdot xAl_2O_3$ were prepared using an alum decomposition process and the surface area recorded using a BET method. The spinels were examined by x-ray diffraction. Alpha phase content levels of under 1% are recorded as zero. Three comparative examples with no magnesium content were prepared. The properties of the spinel prepared according to the invention and the comparative examples are provided below:

| X $MgO \cdot xAl_2O_3$ | Calcination Temperature (° C.) | BET Specific Area ($m^2/g$) | Alpha yield (%) |
|---|---|---|---|
| Only alumina | 1150 | 125 | 0 |
| Only alumina | 1170 | 100 | 3 |
| Only alumina | 1220 | 85 | 10 |
| 25 | 1220 | 100 | 0 |
| 12.5 | 1220 | 91 | 0 |
| 6.25 | 1220 | 86 | 0 |
| 3 | 1220 | 75 | 0 |
| 1 | 1220 | 40 | 0 |

This example shows that including magnesium in the spinel matrix leads to an increase in elementary crystallite size as demonstrated by a decrease in specific area for the crystallites. The decrease in specific area is essentially accomplished without the appearance of alpha alumina as demonstrated by the measurements of less than 1% alpha alumina by X-ray diffraction. Therefore, because alpha phase particles are not formed, the properties of the abrasive can be modulated by the magnesium content. In addition, as shown in this example, the surface area decreases and the degree of agglomeration increases with an increase in calcination temperature.

EXAMPLE 2

Spinels of the formula $MgO \cdot xAl_2O_3$ were prepared and the surface area and crystallite size recorded.

| X $MgO \cdot xAl_2O_3$ | SA ($m^2/g$) | Crystallite size (Angstrom) |
|---|---|---|
| 6 | 90 | 65 |
| 6 | 76 | 77 |
| 3 | 78 | 85 |

-continued

| X MgO•xAl$_2$O$_3$ | SA (m$^2$/g) | Crystallite size (Angstrom) |
|---|---|---|
| 3 | 66 | 85 |
| 2 | 78 | 85 |
| 2 | 61 | 87 |
| 1 | 46 | 142 |
| 1 | 24 | 193 |

EXAMPLE 3

A spinel of the formula MgO•6Al$_2$O$_3$ was prepared in accordance with the invention and included the following properties as measured using x-ray diffraction and a Horiba LA-910 particle size analyzer:

| Composition | MgO•6Al$_2$O$_3$ |
|---|---|
| Specific surface (m$^2$/g) | 78 |
| Particle = agglomerate (μm) | 0.3 |
| Aggregate (μm) | 0.1 |
| Ultimate crystallite (nm) | 20 |
| particle shape | crystallites string no sharp angles |
| porosity | |
| macro-meso porosity | |
| pore diameter (μm) | 0.1 |
| pore volume (cc/g) | 0.4 |
| meso-micro porosity | |
| pore diameter (nm) | 20 |
| pore volume (cc/g) | 1.6 |
| Hardness (Mohs scale) | 7.5 |

EXAMPLE 4

Spinel particles of the invention were formed into slurry compositions and used in a CMP process to polish metal surfaces. Process conditions were: IPEC 472 polisher with a IC1400 pad, 5 psi down pressure, platen 50 rpm, carrier 51 rpm. The slurry was pumped at 150 ml/min for 60 sec. Surface conditions following polishing were smooth with no visible scratches detected using optical microscopy.

| Wafer Type | Removal Rate Å/min | Spinel Type | Oxidizing Agent |
|---|---|---|---|
| CVD Tungsten | 5378 | 4% MgO•3Al$_2$O$_3$ | 5.8% Ferric nitrate |
| PVD Titanium | 567 | 4% MgO•3Al$_2$O$_3$ | 5.8% Ferric nitrate |
| CVD Tungsten | 5163 | 4% MgO•6Al$_2$O$_3$ | 5.8% Ferric nitrate |
| PVD Titanium | 564 | 4% MgO•6Al$_2$O$_3$ | 5.8% Ferric nitrate |
| CVD Tungsten | 3584 | 5% MgO•3Al$_2$O$_3$ | 5% Periodic acid |
| PVD Titanium | 868 | 5% MgO•3Al$_2$O$_3$ | 5% Periodic acid |
| CVD Tungsten | 3208 | 5% MgO•6Al$_2$O$_3$ | 5% Periodic acid |
| PVD Titanium | 559 | 5% (MgO)•6Al$_2$O$_3$ | 5% Periodic acid |

EXAMPLE 5

Slurries were prepared in accordance with the invention and including the compounds listed in the following table (the balance being water). The values next to the particles correspond to the milled mean particle size and the powders were unmilled particles. The following results occurred for these slurries in polishing tungsten, titanium and TEOS films:

| Sample | Component A | Component B | Component C | Component D | W r/r[1] - n/u %[2] | Ti r/r | TEOS r/r |
|---|---|---|---|---|---|---|---|
| A | 5% ZnO.Al$_2$O$_3$ powder | | 5% periodic acid | | 2836 Å/min-8% | 2516 Å/min | 605 Å/min |
| B | 5% ZrO2 250 nm | | 5% periodic acid | | 1834 Å/min-7% | 1752 Å/min | 2890 Å/min |
| C | 4.5% CR-85[3] 150 nm | 0.5% DP171 SiO2[4] | 5% periodic acid | | 2447 Å/min-11% | 1874 Å/min | 728 Å/min |
| D | 4% CR-85 150 nm | 1% ZrO2 250 nm | 5% periodic acid | | 1939 Å/min-10% | 1862 Å/min | 618 Å/min |
| E | 2.5% CR-85 300 nm | 2.5% nanotek[5] | 5% periodic acid | | 2400 Å/min-11% | 2292 Å/min | 648 Å/min |
| F | 2% ZnO.Al$_2$O$_3$ powder | | 6% ferric nitrate | | 4628 Å/min[6]-12% | 1358 Å/min | 52 Å/min |
| G | 1% ZnO.Al$_2$O$_3$ powder | 1% DP171 SiO2 | 6% ferric nitrate | | 5482 Å/min-11% | 2332 Å/min | 200 Å/min |
| H | 1% ZnO.Al$_2$O$_3$ powder | 1% DP 171 SiO2 | 6% ferric nitrate | 0.2% 50HB170[7] | 5525 Å/min-8% | 1030 Å/min | 176 Å/min |
| I | 2% ZnO.Al$_2$O$_3$ 2 pass[8] | | 6% ferric nitrate | | 5542 Å/min-6% | 725 Å/min | 87 Å/min |
| J | 1.8% ZnO.Al$_2$O$_3$ 2 pass | 0.2 DP 171 SiO2 | 6% ferric nitrate | | 5700 Å/min-8% | 61 Å/min | 166 Å/min |
| K | 2% MgO.6Al$_2$O$_3$ powder | | 6% ferric nitrate | | 5312 Å/min-14% | 642 Å/min | 41 Å/min |
| L | 2% MgO.6Al$_2$O$_3$ 2 pass | | 6% ferric nitrate | | 5735 Å/min-15% | 554 Å/min | 64 Å/min |
| M | 1.8% MgO.6Al$_2$O$_3$ 2 pass | 0.2% DP171 SiO2 | 6% ferric nitrate | | 5709 Å/min-16% | 586 Å/min | 154 Å/min |
| N | 2% CR-85 powder | | 6% ferric nitrate | | 6539 Å/min-15% | 1046 Å/min | 75 Å/min |

[1]r/r denotes removal rate
[2]n/u denotes non-uniformity and is defined as (standard deviation/mean) × 100%
[3]CR-85 is a gamma and alpha phase alumina blend commercially available from Baikowski Chimie
[4]DP171 is an acid-stabilized silica from E. I. DuPont de Nemours
[5]Nanotek is an abrasive formed of spherical gamma alumina particles and is available from Nanophase Technologies
[6]The removal rate for this example was the average of two runs
[7]50HB170 is a commercially available lubricant
[8]2 pass means that the powder was milled twice to reduce the mean particle size As shown in this example, samples A and F-M prepared according to the invention had good tungsten and titanium removal rates that were comparable to those of conventional samples B-E and N. In addition, samples A and F-M had relatively low TEOS removal rates as desired in the art.

EXAMPLE 6

Polishing tests were conducted on tungsten using a slurry containing a conventional alumina product (CR-85 alumina from Baikowski Chimie) and two spinel particle slurries (one further containing silica particles). Atomic force microscopy (AFM) scans were used to measure the surface finish and tungsten plug recesses for polished wafer test surfaces. The results are summarized below:

| AFM ID starts with: | Abrasive | Oxidizer | Finish | Plug Recess |
|---|---|---|---|---|
| W-1 | CR-85 alumina | ferric nitrate | scratched | 185 Å |
| W-3 | MgO•6Al$_2$O$_3$ powder and SiO2 | ferric nitrate | smooth | 157–196 Å |
| W-4 | MgO•6Al$_2$O$_3$ milled | ferric nitrate | smooth | 147–176 Å |

As shown in the above table, the slurries including spinel abrasives according to the invention produced smooth finishes. The sample that used CR-85 alumina required an additional buffing or oxide polishing step to remove scratches before further processing.

EXAMPLE 7

Tests were conducted using a Tencor P-2 Profiler to measure the oxide erosion of a test wafer comprising a 2500 μm array of 0.5 μm tungsten plugs (50% density) at center and edge locations. The wafers were polished using a Rodel IC1000/Suba IV pad at a down force of 5 psi, platen speed of 50 rpm, carrier speed of 51 rpm, and slurry flow rate of 150 ml/min. The clear time was the total polish time for removing the tungsten and titanium films leaving TEOS and exposed tungsten plug arrays. The results for various slurry compositions are provided below:

| Abrasive | Oxidizer | Clear Time (sec) | Oxide erosion (Center) | Oxide erosion (Edge) |
|---|---|---|---|---|
| SiO$_2$ | 4% H$_2$O$_2$ | 240 | 1020 Å | 884 Å |
| 50-50 Al$_2$O$_3$[1] | 5% periodic acid | 315 | 427 Å | 624 Å |
| 5% MgO.Al$_2$O$_3$[2] | 5% periodic acid 1.34% Mg(NO$_3$)$_2$ | 420 | 488 Å | 792 Å |
| 2% CR-85 Al$_2$O$_3$ | 6% ferric nitrate | 195 | 537 Å | 628 Å |
| 2% 50-50 Al$_2$O$_3$ | 6% ferric nitrate | 220 | 1241 Å | 1243 Å |
| 1% MgO.6Al$_2$O$_3$[3] 1% DP171 SiO$_2$ | 6% ferric nitrate | 225 | 849 Å | 774 Å |
| 2% MgO.6Al$_2$O$_3$[4] | 6% ferric nitrate | 285 | 1231 Å | 1177 Å |

[1]50-50 Al$_2$O$_3$ is a blend of 50% alpha/gamma phase alumina and 50% spherical gamma alumina
[2]MgO.Al$_2$O$_3$ is the milled 46 m$^2$/g and 142 Å particle from Example 2
[3]MgO.6Al$_2$O$_3$ is the unmilled 76 m$^2$/g and 77 Å particle from Example 2
[4]MgO.6Al$_2$O$_3$ is the wet milled 76 m$^2$/g and 77 Å particle from Example 2

As demonstrated above, the MgO•Al$_2$O$_3$ spinel particles in periodic acid produced better oxide erosion results than silica in hydrogen peroxide. In ferric nitrate, the combination of MgO•6Al$_2$O$_3$ and SiO$_2$ offers oxide erosion advantages over 50-50 alumina and the wet milled MgO•6Al$_2$O$_3$. This combination does not offer oxide erosion advantages over CR-85 alumina but CR-85 alumina scratches the surface and requires an oxide polishing step to remove microscratches.

It is understood that upon reading the above description of the present invention and reviewing the accompanying drawings, one skilled in the art could make changes and variations therefrom. These changes and variations are included in the spirit and scope of the following appended claims.

That which is claimed:

1. A slurry composition for chemical mechanical polishing comprising spinel particles having the formula AO•xZ$_2$O$_3$ wherein A is at least one divalent cation, Z is at least one trivalent cation, and $0.01 \leq x \leq 100$, said particles having a mean crystallite diameter of between about 5 and about 500 nm and a mean aggregate particle diameter of between about 20 and about 5000 nm.

2. The slurry composition according to claim 1 being substantially free of particles having a Mohs hardness of greater than 8.5.

3. The slurry composition according to claim 1 being substantially free of alpha phase alumina particles.

4. The slurry composition according to claim 1, wherein said particles have a specific area of between about 5 m$^2$/g and about 200 m$^2$/g.

5. The slurry composition according to claim 1, wherein $1 \leq x \leq 100$.

6. The slurry composition according to claim 1, wherein $1 \leq x \leq 12.5$.

7. The slurry composition according to claim 1, wherein A is selected from the group consisting of Mg, Fe$^{2+}$, Zn, Mn, Ni, Ca, and combinations thereof; and Z is selected from the group consisting of Al, Fe$^{3+}$, Cr, Ti, and mixtures thereof.

8. The slurry composition according to claim 1, wherein the spinel particles include a small amount of at least one cation selected from the group consisting of Zr, Si, Ga, Cu, Co, V, B, Li, rare earth cations, and mixtures thereof.

9. The slurry composition according to claim 1, wherein A is Mg and Z is Al.

10. The slurry composition according to claim 1, wherein A is Zn and Z is Al.

11. The slurry composition according to claim 1 further comprising an oxidizing agent.

12. The slurry composition according to claim 11, wherein the oxidizing agent is ferric nitrate.

13. The slurry composition according to claim 11, wherein the oxidizing agent is periodic acid.

14. The slurry composition according to claim 11, wherein the oxidizing agent is hydrogen peroxide.

15. The slurry composition according to claim 11, wherein the oxidizing agent is selected from the group consisting of hydroxylamine and hydroxylamine salts.

16. The slurry composition according to claim 1, wherein the spinel particles are present in an amount between about 0.1 and about 10 percent by weight.

17. The slurry composition according to claim 1, further comprising additional particles selected from the group consisting of alumina, silica, ceria, germania, zirconia, tin oxide, silicon carbide, titanium dioxide, titanium carbide, and mixtures thereof, said additional particles present in an amount between about 0.1 and about 10 percent by weight.

18. The slurry composition according to claim 1 having a Zeta potential of greater than about +10 mV or less than about −10 mV.

19. A slurry composition for chemical mechanical polishing comprising: 0.1 to 10% by weight of spinel particles having the formula AO•xZ$_2$O$_3$ wherein A is at least one divalent cation, Z is at least one trivalent cation, and $1 \leq x \leq 12$, said particles having a mean crystallite diameter of between about 5 and about 500 nm and a mean aggregate particle diameter of between about 20 and about 5000 nm, the slurry composition being substantially free of particles having a Mohs hardness of greater than 8.5;

1 to 15% of an oxidizing agent; and water.

20. A slurry composition for chemical mechanical polishing comprising between 0.1 and 1 percent by weight of spinel particles having the formula MgO•xAl$_2$O$_3$ wherein $1 \leq x \leq 12$, a specific area of between about 5 m$^2$/g and about 200 m$^2$/g, a mean crystallite diameter of between about 5 and about 500 nm, and a mean aggregate particle diameter of between about 20 and about 5000 nm, said slurry composition being substantially free of alpha phase alumina particles.

21. A slurry composition for chemical mechanical polishing comprising between 0.1 and 1 percent by weight of spinel particles having the formula ZnO•xAl$_2$O$_3$ wherein $1 \leq x \leq 12$, a specific area of between about 5 m$^2$/g and about 200 m$^2$/g, a mean crystallite diameter of between about 5 and about 500 nm, and a mean aggregate particle diameter of between about 20 and about 5000 nm, said slurry composition being substantially free of alpha phase alumina particles.

22. A slurry composition for chemical mechanical polishing comprising spinel particles having the formula MgO•xAl$_2$O$_3$, said particles having a mean crystallite diameter of between about 5 and about 500 nm and a mean aggregate particle diameter of between about 20 and about 5000 nm, wherein the ratio of MgO:Al$_2$O$_3$ (1/x) and the specific area are selected to be in the region above the SN6(−), SN3(−), and SN1(−) tie line as defined in FIG. 1.

23. A method of chemical mechanical polishing a substrate comprising the steps of:

applying a slurry composition to a surface of a substrate, said slurry composition comprising spinel particles having the formula AO•xZ$_2$O$_3$ wherein A is at least one divalent cation, Z is at least one trivalent cation, $0.01 \leq x \leq 100$, said particles having a mean crystallite diameter of between about 5 and about 500 nm and a mean aggregate particle diameter of between about 20 and about 5000 nm; and polishing the surface of the substrate.

24. The method according to claim 23, wherein said applying step comprises applying a slurry composition that is substantially free of particles having a Mohs hardness of greater than 8.5.

25. The method according to claim 23, wherein said applying step comprises applying a slurry composition that is substantially free of alpha phase alumina particles.

26. The method according to claim 23, wherein said applying step comprises applying a slurry composition comprising spinel particles having a specific area between about 5 m$^2$/g and about 200 m$^2$/g.

27. The method according to claim 23, wherein said applying step comprises applying a slurry composition wherein $1 \leq x \leq 100$.

28. The method according to claim 23, wherein said applying step comprises applying a slurry composition wherein $1 \leq x \leq 12.5$.

29. The method according to claim 23, wherein said applying step comprises applying a slurry composition wherein A is selected from the group consisting of Mg, Fe$^{2+}$, Zn, Mn, Ni, Ca, and combinations thereof; and Z is selected from the group consisting of Al, Fe$^{3+}$, Cr, Ti, and mixtures thereof.

30. The method according to claim 23, wherein said applying step comprises applying a slurry composition wherein the spinel particles include a small amount of at least one cation selected from the group consisting of Zr, Si, Ga, Cu, Co, V, B, Li, rare earth cations, and mixtures thereof.

31. The method according to claim 23, wherein said applying step comprises applying a slurry composition wherein A is Mg and Z is Al.

32. The method according to claim 23, wherein said applying step comprises applying a slurry composition wherein A is Zn and Z is Al.

33. The method according to claim 23, wherein said applying step comprises applying a slurry composition further comprising additional particles selected from the group consisting of alumina, silica, ceria, germania, zirconia, tin oxide, silicon carbide, titanium dioxide, titanium carbide, and mixtures thereof, said additional particles present in an amount between about 0.1 and about 10 percent by weight.

34. The method according to claim 23, wherein said applying step comprises applying a slurry composition having a Zeta potential of greater than about +10 mV or less than about −10 mV.

35. The method according to claim 23, further comprising the step of preparing spinel particles by thermally decomposing one or more source compounds comprising A cations and Z cations.

36. The method according to claim 35, wherein said preparing step comprises preparing spinel particles wherein Z is Al by decomposing ammonium alum at an elevated temperature with at least one source compound including A cations.

37. The method according to claim 23, wherein the surface is a metal or metal oxide surface.

38. The method according to claim 23, wherein the surface is selected from the group consisting of tungsten, aluminum, copper, titanium, titanium nitride, tantalum, silicon nitride, low-K dielectric, high-K dielectric, silicon, polysilicon, and tetraethoxysilane surfaces.

39. The method according to claim 23, wherein the substrate is selected from the group consisting of semiconductor wafers, metals, ceramics, hat disk surfaces, and magnetic rewrite disk heads.

40. A substrate polished according to the method of claim 23.

41. The slurry composition according to claim 1, wherein said particles have a specific area of between 50 $m^2/g$ and 150 $m^2/g$.

42. The slurry composition according to claim 1, wherein said particles have a crystallite phase distribution including greater than about 95% gamma spinel phase particles.

43. A slurry composition comprising spinel particles having the formula $AO \cdot xZ_2O_3$ wherein A is at least one divalent cation, Z is at least one trivalent cation, and $0.01 \leq x \leq 100$, said particles having a mean crystallite diameter of between about 5 and about 500 nm and a mean aggregate particle diameter of between about 20 and about 5000 nm, said slurry composition being suitable for chemical mechanical polishing.

* * * * *

UNITED STATES PATENT AND TRADEMARK OFFICE
CERTIFICATE OF CORRECTION

PATENT NO. : 6,251,150 B1  Page 1 of 1
DATED : June 26, 2001
INVENTOR(S) : Small et al.

It is certified that error appears in the above-identified patent and that said Letters Patent is hereby corrected as shown below:

<u>Title page,</u>
Item [56], References Cited, U.S. PATENT DOCUMENTS,
Line 13, "Cottinger et al." should read -- Cottringer et al. --.

<u>Column 3,</u>
Line 25, "pH>9" should read -- pH<9 --;
Line 30, "1.7" should read -- -1.7 --.

<u>Column 13-14,</u>
Line 10, in the last table, under the 7th sub-heading, "61" should read -- 611 --.

<u>Column 20,</u>
Line 1, "hat" should read -- hard --.

Signed and Sealed this

Fifth Day of February, 2002

Attest:

JAMES E. ROGAN
*Attesting Officer*   *Director of the United States Patent and Trademark Office*